US011068113B2

(12) United States Patent
Deng et al.

(10) Patent No.: US 11,068,113 B2
(45) Date of Patent: Jul. 20, 2021

(54) TOUCH ELECTRODE AND TOUCH DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventors: Yichao Deng, Wuhan (CN); Qibing Dai, Wuhan (CN); Yalong Ma, Wuhan (CN)

(*) Notice: Subject to any disclaimer, the term of this patent is extended or adjusted under 35 U.S.C. 154(b) by 195 days.

(21) Appl. No.: 16/469,157

(22) PCT Filed: Dec. 11, 2018

(86) PCT No.: PCT/CN2018/120419
§ 371 (c)(1),
(2) Date: Jun. 13, 2019

(87) PCT Pub. No.: WO2020/113624
PCT Pub. Date: Jun. 11, 2020

(65) Prior Publication Data
US 2021/0181896 A1    Jun. 17, 2021

(30) Foreign Application Priority Data
Dec. 3, 2018  (CN) .......................... 201811468048.X

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 2203/04111* (2013.01)

(58) Field of Classification Search
CPC ................ G06F 3/0446; G06F 3/0312; G06F 2203/04111
See application file for complete search history.

(56) References Cited

U.S. PATENT DOCUMENTS

| 2016/0202789 | A1* | 7/2016 | Kim ..................... G06F 3/0412 345/174 |
| 2019/0361546 | A1* | 11/2019 | Pang ..................... G06F 3/0446 |

* cited by examiner

*Primary Examiner* — Peter D McLoone

(57) ABSTRACT

Disclosed is a touch electrode and a touch display device. The touch electrode comprises a plurality of first electrode chains and second electrode chains intersecting with the first electrode chains. Each of the first electrode chains comprises a plurality of first electrodes and a first connecting portion. Each of the second electrode chains comprises a plurality of second electrodes and a second connecting portion. Each of the second connecting portions comprises a connecting island located between the two adjacent second electrodes, at least one first connecting bridge electrically connecting the connecting island and one of the two adjacent second electrodes and at least one second connecting bridge electrically connecting the connecting island and the other of the two adjacent second electrodes. By means of the present invention, the length of the connecting bridge can be reduced and the breaking of the connection can be prevented.

16 Claims, 4 Drawing Sheets

TOUCH ELECTRODE AND TOUCH DISPLAY DEVICE

FIELD OF INVENTION

The present invention relates to the field of display technologies, and in particular, to a touch electrode and a touch display device.

BACKGROUND OF INVENTION

With development of display technologies, flat-panel display devices, such as liquid crystal display (LCD) devices are widely employed in various consumer electronics, such as mobile phones, televisions, personal digital assistants, digital cameras, notebook computers, desktop computers, and so on due to their high definition, power saving, thin body, and a wide range of application, becoming the mainstream of the display devices.

A touch panel provides a new human-computer interaction interface which is more direct and user-friendly in use. The touch panel and the flat display device are integrated to form a touch display device, which can enable the flat display device to have a touch function to perform input by a finger, a stylus, and so on so that the operation is more intuitive and simpler.

Touch display panels can be categorized into four types, according to different techniques of detection, which are resistive, capacitive, optical, and sound wave sensing types. Mainstream touch technology is the capacitive type, which is further divided into a self-capacitance type and a mutual capacitance type. The capacitive touch display panels that are currently available on the market are primarily the mutual capacitance type. An advantage of the mutual capacitance type is the capability of multiple point touch control. The touch display panels can be further classified into, according to the structures thereof, on-cell, in-cell, and external mounting types, among which the in-cell type possesses advantages of low cost, being ultra-thin, and narrowed frames and are generally applied in high-end touch products. However, due to factors, such as higher technical difficulty and being susceptible to signal interference, the sensitivity of the in-cell touch technologies is generally poor. The touch display panels that are most widely used in the current market are still external mounting touch display panels. Advantages of the external mounting touch display panels include high sensitivity and fast response speed, but there are also disadvantages including high cost and limitation on product thinning. The on-cell types possessing the advantages of both the external mounting type and the in-cell type cannot only increase sensitivity but also decrease panel thickness.

As shown in FIG. 1, the conventional touch electrodes generally include a plurality of mutually parallel and separated first electrode chains 1' and a plurality of mutually parallel and separated second electrode chains 2' intersecting with the first electrode chains 1' and insulated from the first electrode chains 1'. Each of the first electrode chains 1' includes a plurality of mutually separated first electrodes 11' and a first connecting line 12' located at an intersection of the first electrode chains 1' and the second electrode chains 2', and the two adjacent first electrodes 11' are electrically connected through the first connecting line 12'. Each of the second electrode chains 2' includes a plurality of mutually separated second electrodes 21' and a second connecting line 22' located at an intersection of the second electrode chains 2' and the first electrode chains 1', and the two adjacent second electrodes 21' are electrically connected through the second connecting line 22', and the second connecting line 22' is insulated from the first connecting line 12'. The first electrode 11', the second electrode 21' and the first connecting line 12' are located at a same film layer, and the second connecting line 22' is at another film layer different from the film layer where the first connecting line 12' is located. Moreover, there is an insulating layer between the film layer where the second connecting line 22' is located and the film layer where the first connecting line 12' is located. The second connecting line 22' is connected to the second electrodes 21' by a via hole 30' passing through the insulating layer. However, the current touch electrodes have the following problems. First, the second electrodes 21' is farther from the adjacent second electrodes 21' so that the length of the second connecting line 22' is excessively long. Thus, in an actual process, the connecting position would blacken or brighten to lower the display quality due to the excessively long length of the second connecting line 22'. Secondly, the adjacent second electrodes 21' are connected by only one second connecting line 22'. However, the broken line, electrical breakdown, and other defects of the second connecting line 22' with the long length are likely to occur in an actual process, thus resulting in touch failure.

SUMMARY OF INVENTION

It is an object of the present invention to provide a touch electrode that can reduce connection defects and improve product stability.

Another object of the present invention is to provide a touch display device capable of reducing connection defects, improving touch stability, and improving display quality.

In order to achieve the above object, the present invention provides a touch electrode comprising a plurality of mutually parallel and separated first electrode chains and a plurality of mutually parallel and separated second electrode chains configured to intersect with the first electrode chains and to be insulated from the first electrode chains. Each of the first electrode chains comprises a plurality of mutually separated first electrodes and a first connecting portion located at an intersection of the first electrode chain and the second electrode chain, and the two adjacent first electrodes are electrically connected through the first connecting portion. Each of the second electrode chains comprises a plurality of mutually separated second electrodes and a second connecting portion located at an intersection of the first electrode chain and the second electrode chain, and the two adjacent second electrodes are electrically connected through the second connecting portion, and the second connecting portion is insulated from the first connecting portion. Each of the second connecting portions comprises a connecting island located between the two adjacent second electrodes, at least one first connecting bridge electrically connecting the connecting island and one of the two adjacent second electrodes and at least one second connecting bridge electrically connecting the connecting island and the other of the two adjacent second electrodes.

The first electrode, the first connecting portion, the second electrode and the connecting island are located at a same film layer. A hollow area is formed in each of the first connecting portions, and the connecting island is located in the hollow area and is separated from the first connecting portion. The first connecting bridge and the second connecting bridge are located at a same film layer, and an insulating layer is provided between the film layer where the first electrode, the first connecting portion, the second electrode and the connecting island are located and the film layer where the first connecting bridge and the second connecting bridge are located. The first connecting bridge and the second connecting bridge respectively connect the connecting island and the second electrode by a first via hole passing through the insulating layer.

Each of the second connecting portions further includes at least one third connecting bridge which directly electrically connects the two adjacent second electrodes.

A gap is formed between the adjacent first electrode and second electrode, and the gap is provided with a blank electrode insulated from the first electrode and the second electrode.

All the first electrode, the second electrode and the blank electrode are located at the same film layer, and the blank electrode is separated from the first electrode and the second electrode.

The numbers of the first connecting bridge and the second connecting bridge in each of the second connecting portions are both one or two.

The number of the third connecting bridge in each of the second connecting portions is two, and the two third connecting bridges are respectively disposed at the two sides of the connecting island.

The materials of the first electrode and the second electrode are indium tin oxide or indium zinc oxide, and the materials of the first connecting bridge and the second connecting bridge are selected from a group consisting of indium tin oxide, indium zinc oxide, molybdenum, titanium, copper, and aluminum or a combination of more thereof.

The material of the third connecting bridge is selected from a group consisting of indium tin oxide, indium zinc oxide, molybdenum, titanium, copper and aluminum or a combination of more thereof.

The present invention further provides a touch display device including the above touch electrodes.

The benefit effects of the present invention: a touch electrode provided by the present invention comprises a plurality of mutually parallel and separated first electrode chains and a plurality of mutually parallel and separated second electrode chains configured to intersect with the first electrode chains and to be insulated from the first electrode chains. Each of the first electrode chains comprises a plurality of mutually separated first electrodes and a first connecting portion located at an intersection of the first electrode chain and the second electrode chain, and the two adjacent first electrodes are electrically connected through the first connecting portion. Each of the second electrode chains comprises a plurality of mutually separated second electrodes and a second connecting portion located at an intersection of the first electrode chain and the second electrode chain, and the two adjacent second electrodes are electrically connected through the second connecting portion, and the second connecting portion is insulated from the first connecting portion. Each of the second connecting portions comprises a connecting island located between the two adjacent second electrodes, at least one first connecting bridge electrically connecting the connecting island and one of the two adjacent second electrodes and at least one second connecting bridge electrically connecting the connecting island and the other of the two adjacent second electrodes. Accordingly, the length of the connecting bridge can be reduced for preventing the connection from breaking so as to improve the product stability while improve the display effect. The present invention further provides a touch display device which is capable of reducing the connection defects, increasing the touch stability and improving the display quality.

BRIEF DESCRIPTION OF THE DRAWINGS

The characteristic features and the technical solutions of the present invention are best understood from the following detailed description with reference to the accompanying figures. However, the accompanying figures are only provided for the reference and illustration, but not to limit the present invention.

In the drawings.

DETAILED DESCRIPTION OF EMBODIMENTS

In order to further elaborate the technical means and effects adopted by the present invention, the present invention will be further described in detail with the preferred embodiments and the accompanying drawings.

Figure 1:
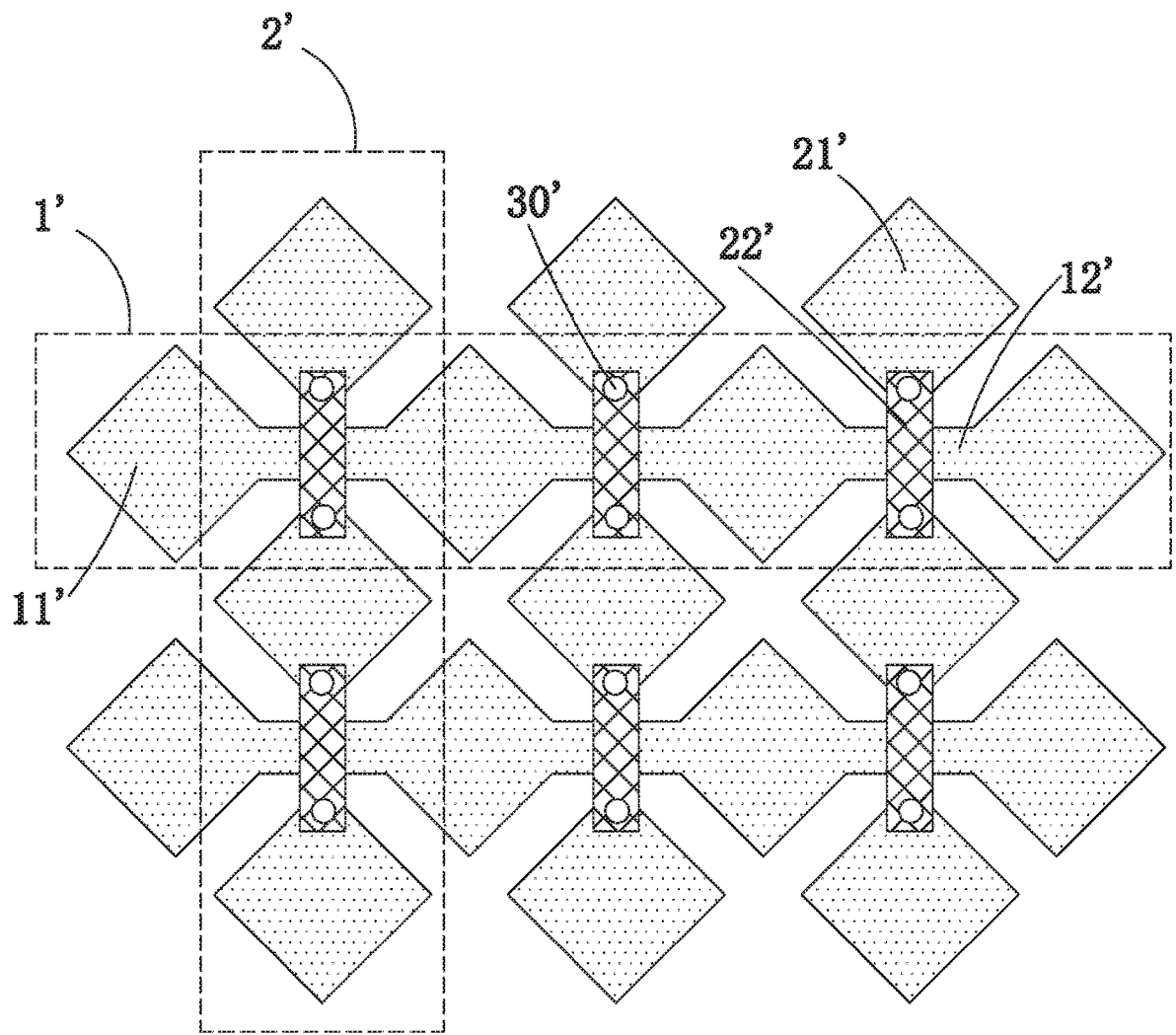
FIG. 1 is a schematic view of a current touch electrode.
Figure 2:
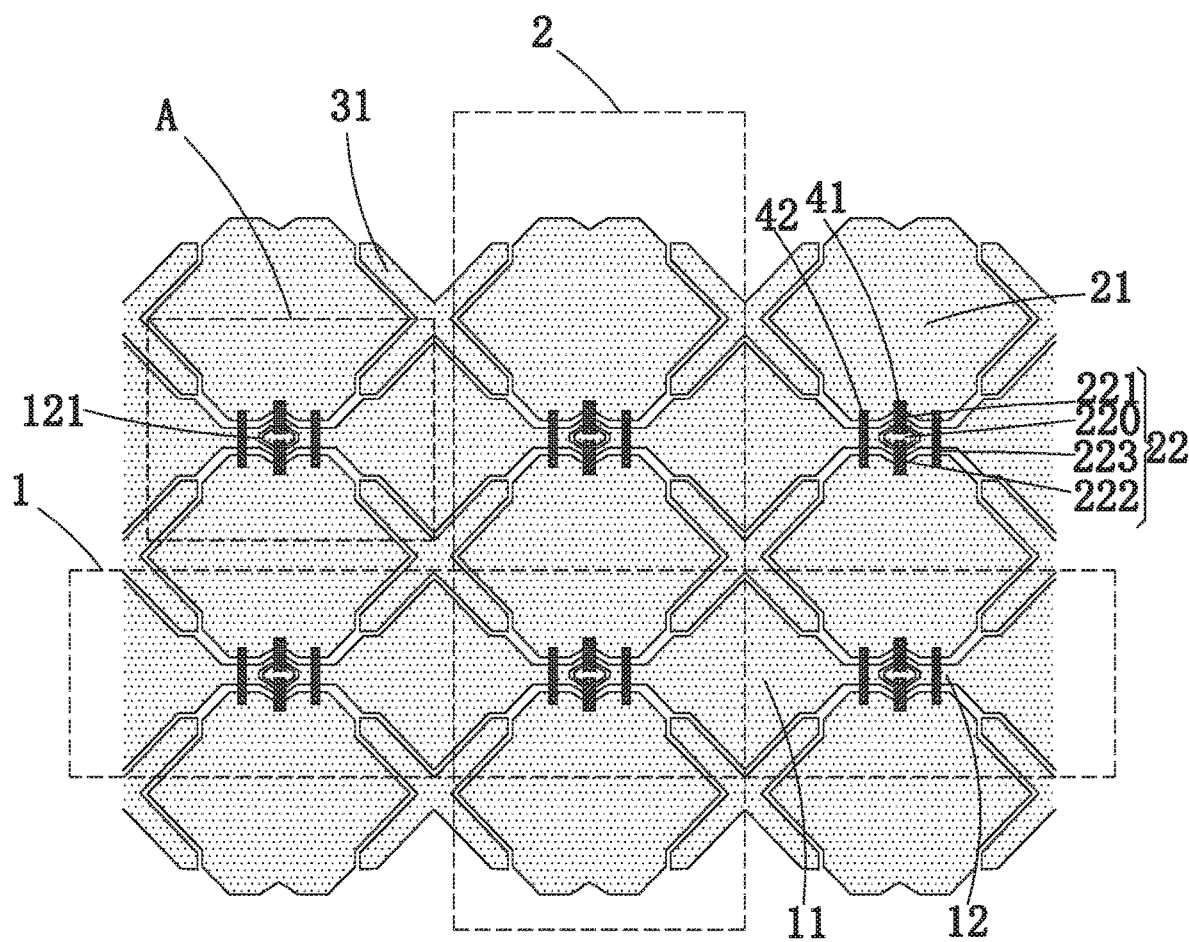
FIG. 2 is a schematic view of a touch electrode of the present invention.
Figure 3:
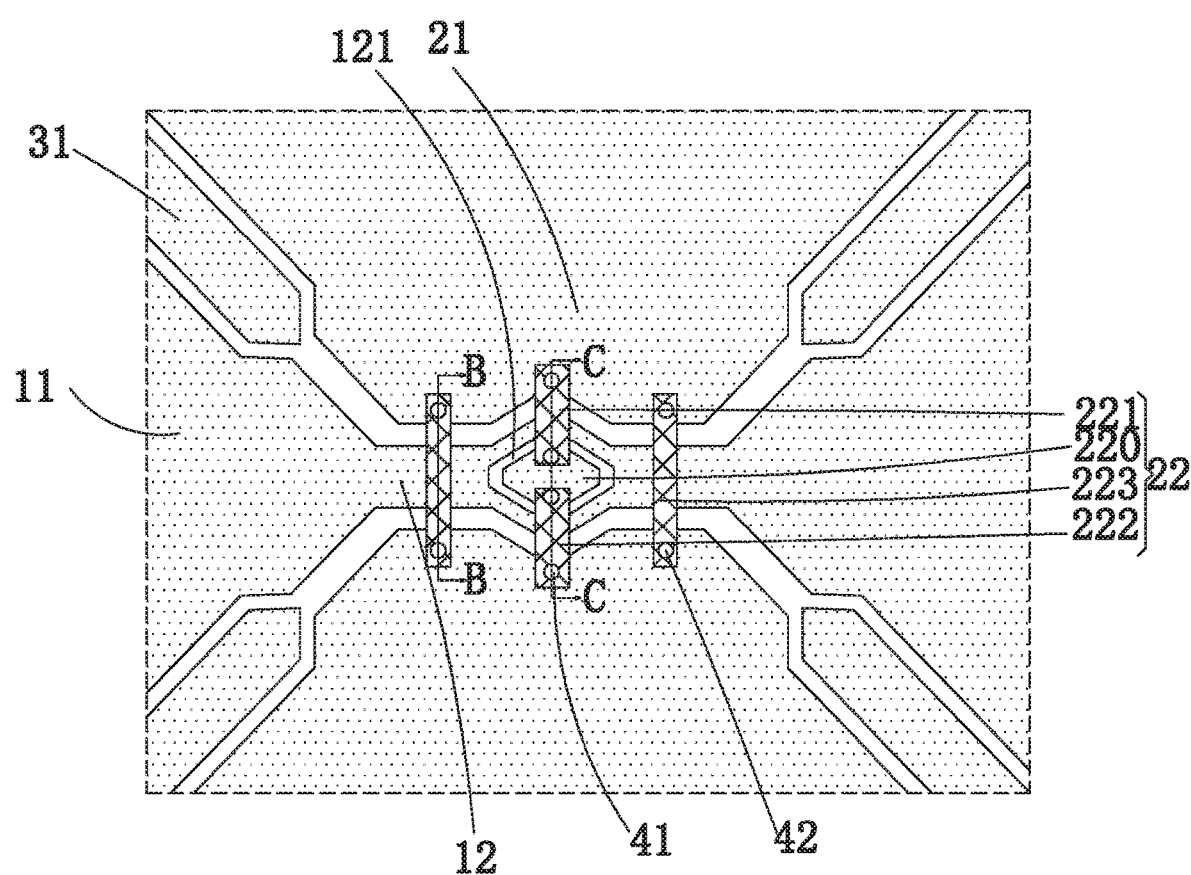
FIG. 3 is a drawing of enlargement of the position A in FIG. 2.
Figure 4:
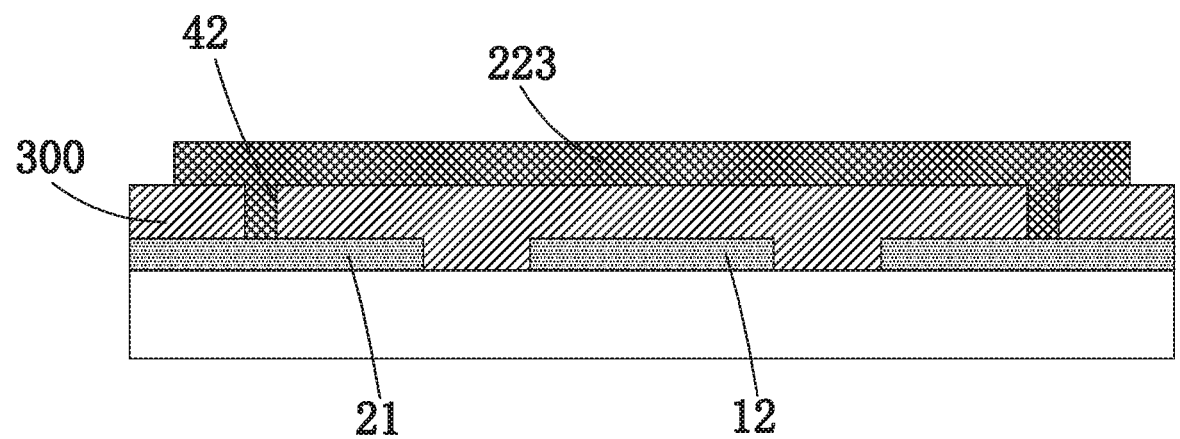
FIG. 4 is a cross-sectional view taken along line B-B in FIG. 3.
Figure 5:
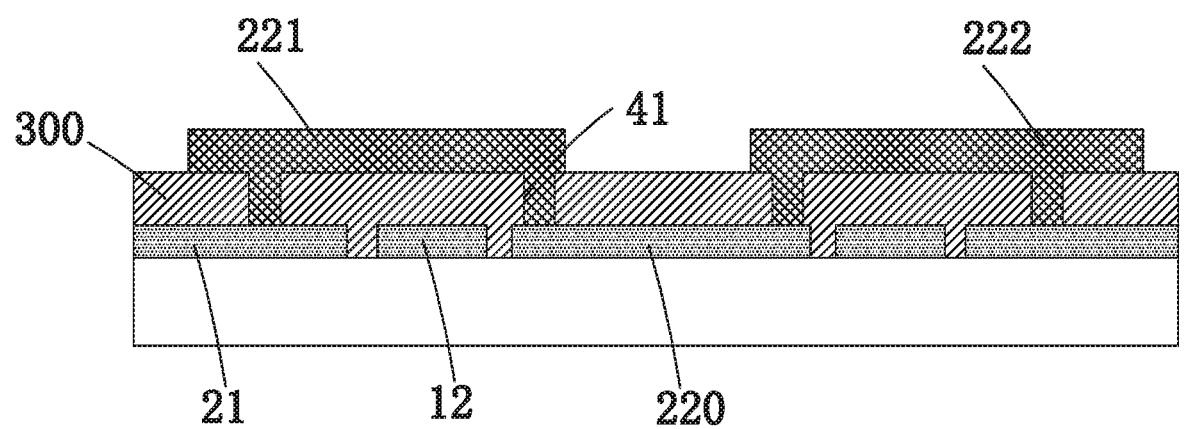
FIG. 5 is a cross-sectional view taken along line C-C in FIG. 3.

Please refer to FIG. 2 to FIG. 5, the present invention provides a touch electrode including a plurality of mutually parallel and separated first electrode chains 1 and a plurality of mutually parallel and separated second electrode chains 2 configured to intersect with the first electrode chains 1 and to be insulated from the first electrode chains 1.

Each of the first electrode chains 1 comprises a plurality of mutually separated first electrodes 11 and a first connecting portion 12 located at an intersection of the first electrode chains 1 and the second electrode chains 2, and the two adjacent first electrodes 11 are electrically connected through the first connecting portion 12.

Each of the second electrode chains 2 comprises a plurality of mutually separated second electrodes 21 and a second connecting portion 22 located at an intersection of the second electrode chains 2 and the first electrode chains 1, and the two adjacent second electrodes 21 are electrically connected through the second connecting portion 22, and the second connecting portion 22 is insulated from the first connecting portion 12.

Each of the second connecting portions 22 comprises a connecting island 220 located between the two adjacent second electrodes 21, at least one first connecting bridge 221 electrically connecting the connecting island 220 and one of the two adjacent second electrodes 21 and at least one second connecting bridge 222 electrically connecting the connecting island 220 and the other of the two adjacent second electrodes 21.

Specifically, as shown in FIG. 2 to FIG. 5, in the preferred embodiment, the first electrode 11, the first connecting portion 12, the second electrode 21, and the connecting island 220 are located at a same film layer.

A hollow area 121 is formed in each of the first connecting portions 12, and the connecting island 220 is located in the hollow area 121 and is separated from the first connecting portion 12.

The first connecting bridge 221 and the second connecting bridge 222 are located at a same film layer, and the film layer where the first electrode 11, the first connecting portion 12, the second electrode 21, and the connecting island 220 are located is different from the film layer where the first connecting bridge 221 and the second connecting bridge 222. Moreover, an insulating layer 330 is provided between the film layer where the first electrode 11, the first connecting portion 12, the second electrode 21, and the connecting island 220 are located and the film layer where the first connecting bridge 221 and the second connecting bridge 222 are located.

The first connecting bridge 221 and the second connecting bridge 222 respectively connect the connecting island 220 and the second electrode 21 by a first via hole 41 passing through the insulating layer 300.

Further, the two ends of the first connecting bridge 221 and the two end of the second connecting bridge 222 are respectively provided with the first via holes 41. The first connecting bridge 221 electrically connects the connecting island 220 and one of the two adjacent second electrodes 21 by the first via hole 41 at the two ends of the first connecting bridge 221, and the second connecting bridge 222 electrically connects the connecting island 220 and the other of the two adjacent second electrodes 21 by the first via hole 41 at the two ends of the second connecting bridge 222.

Preferably, material of the first electrode 11 and the second electrode 21 are indium tin oxide or indium zinc oxide, and material of the first connecting bridge 221 and the second connecting bridge 222 are selected from a group consisting of indium tin oxide, indium zinc oxide, molybdenum, titanium, copper, and aluminum or a combination of more thereof. More preferably, the material of the first connecting bridge 221 and the second connecting bridge 222 are indium tin oxide or indium zinc oxide. That is, the first connecting bridge 221 and the second connecting bridge 222 are transparent, which can reduce the light-shielding from the first connecting bridge 221 and the second connecting bridge 222 to enhance the display effect.

It should be noted that, in the present invention, by means of disposing the connecting island 220 between the two adjacent second electrodes 21, and connecting the connecting island 220 and the second electrode 21 respectively by the first connecting bridge 221 and the second connecting bridge 222, the connecting bridge with long distance in the prior art can be changed into two connecting bridges with short distance, and thereby the decrease of the display quality and the broken line of the connecting bridge resulting from the excessive distance of the connecting bridge can be effectively reduced so that the stability of the connection of the connecting bridge is increased, preventing touch defects resulting from the broken line of the connecting bridge.

Further, in the preferred embodiment of the invention, each of the second connecting portions 22 further includes at least one third connecting bridge 223 which directly electrically connects the two adjacent second electrodes 21. The third connecting bridge 223, the first connecting bridge 221, and the second connecting bridge 222 are located at the same film layer, and the third connecting bridge 223 electrically connects the two adjacent second electrodes 21 by two second via holes 42 respectively at the two ends of the third connecting bridge 223 passing through the insulating layer 300.

Optionally, material of the third connecting bridge 223 is selected from a group consisting of indium tin oxide, indium zinc oxide, molybdenum, titanium, copper, and aluminum or a combination of more thereof. Preferably, the material of the third connecting bridge 223 is indium tin oxide or indium zinc oxide. That is, the third connecting bridge 223 is transparent, which can reduce the light-shielding from the first connecting bridge 221 and the second connecting bridge 222 to enhance the display effect.

By means of additionally providing the third connecting bridge 223, the two adjacent second electrodes 21 are able to be connected to each other by the third connecting bridge 223 in the circumstance where the broken lines respectively occur at the first connecting bridge 221 and the second connecting bridge 222 so that double protection is achieved and the touch defect resulting from the broken lines is effectively decreased.

Preferably, the numbers of the first connecting bridge 221 and the second connecting bridge 222 in each of the second connecting portions 22 are both one. However, the present invention is not limited to this. If necessary, the numbers of the first connecting bridge 221 and the second connecting bridge 222 in each of the second connecting portions 22 can both be two in such a manner that the two adjacent second electrodes 21 can still be connected to each other by the remaining first connecting bridge 221 and the remaining second connecting bridge 222 in the circumstance where the broken lines respectively occur at one of the two first connecting bridges 221 and one of the two second connecting bridge 222.

Preferably, the number of the third connecting bridge 223 in each of the second connecting portions 22 is two, and the two third connecting bridges 223 are respectively disposed at the two sides of the connecting island 220. The arrangement of the two third connecting bridges 223 can further improve the stability of the connection. That is, when a broken line occurs at one of the two third connecting bridges 223, the connection can still be conducted by the other third connecting bridge 223.

Further, a gap is formed between the adjacent first electrode 11 and second electrode 21, and the gap is provided with a blank electrode 31 insulated from the first electrode 11 and the second electrode 21, wherein all the first electrode 11, the second electrode 21, and the blank electrode 31 are located at the same film layer, and the blank electrode 31 is separated from the first electrode 11 and the second electrode 21.

Specifically, the shape of the blank electrode 31 can be formed according to requirements in such a manner that the adjustment of the capacitance function of the touch screen can be achieved. Preferably, the blank electrode 31 is in a shape of a folding ladder.

Specifically, the first electrode 11, the second electrode 21, the blank electrode 31, the first connecting portion 12 and the connecting island 220 located at the same film layer are simultaneously formed by a pattern forming process while the first connecting bridge 221, the second connecting bridge 222, and the third connecting bridge 223 at another same film layer are simultaneously formed by another pattern forming process.

Based on the above touch electrodes, the present invention further provides a touch display device including the above touch electrodes.

As mentioned above, the present invention provides a touch electrode comprising a plurality of mutually parallel and separated first electrode chains and a plurality of mutually parallel and separated second electrode chains configured to intersect with the first electrode chains and to be insulated from the first electrode chains. Each of the first electrode chains comprises a plurality of mutually separated first electrodes and a first connecting portion located at an intersection of the first electrode chain and the second electrode chain, and the two adjacent first electrodes are electrically connected through the first connecting portion. Each of the second electrode chains comprises a plurality of mutually separated second electrodes and a second connecting portion located at an intersection of the first electrode chain and the second electrode chain, and the two adjacent second electrodes are electrically connected through the second connecting portion, and the second connecting portion is insulated from the first connecting portion. Each of the second connecting portions comprises a connecting island located between the two adjacent second electrodes, at least one first connecting bridge electrically connecting the connecting island and one of the two adjacent second electrodes and at least one second connecting bridge electrically connecting the connecting island and the other of the two adjacent second electrodes. Accordingly, the length of the connecting bridge can be reduced for preventing the connection from breaking so as to improve the product stability while improve the display effect. The present invention further provides a touch display device which is capable of reducing the connection defects, increasing the touch stability and improving the display quality.

Based on the description mentioned above, those having ordinary skills in the art may easily contemplate various changes and modifications of the technical solution and technical ideas of the present invention and all these changes and modifications are considered within the protection scope of right for the present invention.

What is claimed is:

1. A touch electrode, comprising a plurality of mutually parallel and separated first electrode chains and a plurality of mutually parallel and separated second electrode chains configured to intersect with the first electrode chains and be insulated from the first electrode chains;
    wherein each of the first electrode chains comprising a plurality of mutually separated first electrodes and a first connecting portion located at an intersection of the first electrode chain and the second electrode chain, and the two adjacent first electrodes are electrically connected through the first connecting portion;
    wherein each of the second electrode chains comprising a plurality of mutually separated second electrodes and a second connecting portion located at an intersection of the first electrode chain and the second electrode chain, and the two adjacent second electrodes are electrically connected through the second connecting portion, and the second connecting portion is insulated from the first connecting portion;
    wherein each of the second connecting portions comprising a connecting island located between the two adjacent second electrodes, at least one first connecting bridge electrically connecting the connecting island and one of the two adjacent second electrodes and at least one second connecting bridge electrically connecting the connecting island and the other of the two adjacent second electrodes; and
    wherein the first electrode, the first connecting portion, the second electrode, and the connecting island are located on a same film layer; a hollow area is formed in each of the first connecting portions, and the connecting island is located in the hollow area and is separated from the first connecting portion; the first connecting bridge and the second connecting bridge are located on a same film layer, and an insulating layer is provided between the film layer where the first electrode, the first connecting portion, the second electrode, and the connecting island are located and the film layer where the first connecting bridge and the second connecting bridge are located;
    the first connecting bridge and the second connecting bridge respectively connect the connecting island and the second electrode by a first via hole passing through the insulating layer.

2. The touch electrode according to claim 1, wherein each of the second connecting portions further includes at least one third connecting bridge which directly electrically connects the two adjacent second electrodes.

3. The touch electrode according to claim 2, wherein a number of the third connecting bridge in each of the second connecting portions is two, and the two third connecting bridges are respectively disposed at the two sides of the connecting island.

4. The touch electrode according to claim 2, wherein material of the third connecting bridge is selected from a group consisting of indium tin oxide, indium zinc oxide, molybdenum, titanium, copper, and aluminum or a combination of more thereof.

5. The touch electrode according to claim 1, wherein a gap is formed between the adjacent first electrode and second electrode, and the gap is provided with a blank electrode insulated from the first electrode and the second electrode.

6. The touch electrode according to claim 3, wherein all the first electrode, the second electrode, and the blank electrode are located at the same film layer, and the blank electrode is separated from the first electrode and the second electrode.

7. The touch electrode according to claim 1, wherein numbers of the first connecting bridge and the second connecting bridge in each of the second connecting portions are both one or two.

8. The touch electrode according to claim 1, wherein material of the first electrode and the second electrode are indium tin oxide or indium zinc oxide, and material of the first connecting bridge and the second connecting bridge is selected from a group consisting of indium tin oxide, indium zinc oxide, molybdenum, titanium, copper, and aluminum or a combination of more thereof.

9. A touch display device, comprising a touch electrode which includes a plurality of mutually parallel and separated first electrode chains and a plurality of mutually parallel and separated second electrode chains configured to intersect with the first electrode chains and to be insulated from the first electrode chains;
    wherein each of the first electrode chains comprising a plurality of mutually separated first electrodes and a first connecting portion located at an intersection of the first electrode chain and the second electrode chain, and the two adjacent first electrodes are electrically connected through the first connecting portion;
    wherein each of the second electrode chains comprising a plurality of mutually separated second electrodes and a second connecting portion located at an intersection of the first electrode chain and the second electrode chain, and the two adjacent second electrodes are electrically connected through the second connecting portion, and the second connecting portion is insulated from the first connecting portion;
    wherein each of the second connecting portions comprising a connecting island located between the two adjacent second electrodes, at least one first connecting bridge electrically connecting the connecting island and one of the two adjacent second electrodes and at least one second connecting bridge electrically connecting the connecting island and the other of the two adjacent second electrodes; and wherein the first electrode, the first connecting portion, the second electrode, and the connecting island are located on a same film layer; a hollow area is formed in each of the first connecting portions, and the connecting island is located in the hollow area and is separated from the first connecting portion; the first connecting bridge and the second connecting bridge are located on a same film layer, and an insulating layer is provided between the film layer where the first electrode, the first connecting portion, the second electrode, and the connecting island are located and the film layer where the first connecting bridge and the second connecting bridge are located; the first connecting bridge and the second connecting bridge respectively connect the connecting island and the second electrode by a first via hole passing through the insulating layer.

10. The touch display device according to claim 9, wherein each of the second connecting portions further includes at least one third connecting bridge which directly electrically connects the two adjacent second electrodes.

11. The touch display device according to claim 10, wherein the number of the third connecting bridge in each of the second connecting portions is two, and the two third connecting bridges are respectively disposed at the two sides of the connecting island.

12. The touch display device according to claim 10, wherein material of the third connecting bridge is selected from a group consisting of indium tin oxide, indium zinc oxide, molybdenum, titanium, copper, and aluminum or a combination of more thereof.

13. The touch display device according to claim 9, wherein a gap is formed between the adjacent first electrode and second electrode, and the gap is provided with a blank electrode insulated from the first electrode and the second electrode.

14. The touch display device according to claim 13, wherein all the first electrode, the second electrode, and the blank electrode are located at the same film layer, and the blank electrode is separated from the first electrode and the second electrode.

15. The touch display device according to claim 9, wherein the numbers of the first connecting bridge and the second connecting bridge in each of the second connecting portions are both one or two.

16. The touch display device according to claim 9, wherein material of the first electrode and the second electrode is indium tin oxide or indium zinc oxide, and material of the first connecting bridge and the second connecting bridge is selected from a group consisting of indium tin oxide, indium zinc oxide, molybdenum, titanium, copper, and aluminum or a combination of more thereof.

* * * * *